(12) United States Patent
Hori et al.

(10) Patent No.: US 6,941,838 B2
(45) Date of Patent: Sep. 13, 2005

(54) INTERNAL COMBUSTION ENGINE WITH TORQUE CONVERTER

(75) Inventors: Yoshiaki Hori, Saitama (JP); Tohru Nishi, Saitama (JP); Hideyuki Tawara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/300,901

(22) Filed: Nov. 21, 2002

(65) Prior Publication Data

US 2003/0136221 A1 Jul. 24, 2003

(30) Foreign Application Priority Data

Nov. 28, 2001 (JP) ........................................ 2001-362128

(51) Int. Cl.[7] ............................................ F16H 47/00
(52) U.S. Cl. ..................................... 74/730.1; 192/3.21
(58) Field of Search ........................... 74/606 R, 730.1, 74/732.1; 192/3.21

(56) References Cited

U.S. PATENT DOCUMENTS

| 6,325,190 B1 | * | 12/2001 | Yoshimoto et al. | ........ | 192/3.21 |
| 6,484,607 B2 | * | 11/2002 | Shichinohe et al. | ....... | 74/730.1 |
| 6,516,686 B1 | * | 2/2003 | Hori et al. | ................. | 74/730.1 |

FOREIGN PATENT DOCUMENTS

JP          54-122273          2/1953

* cited by examiner

*Primary Examiner*—Tisha D. Lewis
(74) *Attorney, Agent, or Firm*—Birch, Stewart, Kolasch & Birch, LLP

(57) ABSTRACT

An internal combustion engine including a torque converter on a crankshaft, and a single oil passage provided in the crankshaft for supplying, in common, both a working oil for the torque converter and a lubricating oil for the engine. A pump impeller of the torque converter is fixed to the crankshaft, and a clutch for connection and disconnection of engine output is provided on the side of a transmission.

16 Claims, 6 Drawing Sheets

INTERNAL COMBUSTION ENGINE WITH TORQUE CONVERTER

CROSS-REFERENCE TO RELATED APPLICATIONS

The present application claims priority under 35 USC 119 to Japanese Patent Application No. 2001-362128 filed on Nov. 28, 2001 the entire contents thereof is hereby incorporated by reference.

BACKGROUND OF THE INVENTION

1. Field of the Invention

The present invention relates to an improvement in an internal combustion engine for a vehicle that is provided with a torque converter.

2. Description of Background Art

As an internal combustion engine with torque converter is disclosed in Japanese Utility Model Laid-open No. Sho 54-12227. This internal combustion engine includes a torque converter for which an oil hydraulic multiple disk clutch for connection and disconnection of creep is auxiliarily and coaxially provided is fitted to a transmission shaft. An oil hydraulic clutch is operated by an oil branched from a line for supplying the oil to the torque converter. In addition, a structure is provided in which while the torque converter is constantly supplied with the oil, the oil to be supplied to the clutch is interrupted by a relief valve until a predetermined pressure is reached. When a pressure not less than a set pressure is reached attendantly on an increase in rotation, the hydraulic oil flows to connect the clutch, whereby a creep is generated.

In the torque converter for which the oil hydraulic clutch is auxiliarily and coaxially provided, the crankshaft is long, so that it is difficult to mount onto the engine. Where it is intended that the oil passage for the oil hydraulic clutch is used also for a passage of a lubricating oil from the crankshaft to a connecting rod needle, a high pressure for operating the oil hydraulic clutch cannot be maintained. Therefore, it is necessary to provide two systems of oil passages, namely, a high-pressure and a low-pressure oil passage in the crankshaft, so that hole boring for the crankshaft is complicated.

SUMMARY AND OBJECTS OF THE INVENTION

In order to solve the above-mentioned problems in the prior art, the present invention resides in an internal combustion engine with a torque converter, including a crankshaft of the engine and an input shaft of a multi-stage transmission which are connected to each other through a torque converter including a pump impeller connected to the side of the engine and a turbine runner connected to the side of the multi-stage transmission, wherein the pump impeller of the torque converter is fixed to the crankshaft, and a clutch for connection and disconnection the output of the engine is provided on the side of the multi-stage transmission.

According to the present invention constituted as above, the pump impeller of the torque converter is fixed to the crankshaft, so that the torque converter is constantly rotated by the crankshaft. Thus, a speed change shock in the multi-stage transmission is alleviated, and acceleration and deceleration are performed smoothly. In addition, since the clutch for connection and disconnection of the engine output is provided on the side of the multi-stage transmission, the crankshaft is not long, and mountability onto the vehicle is enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
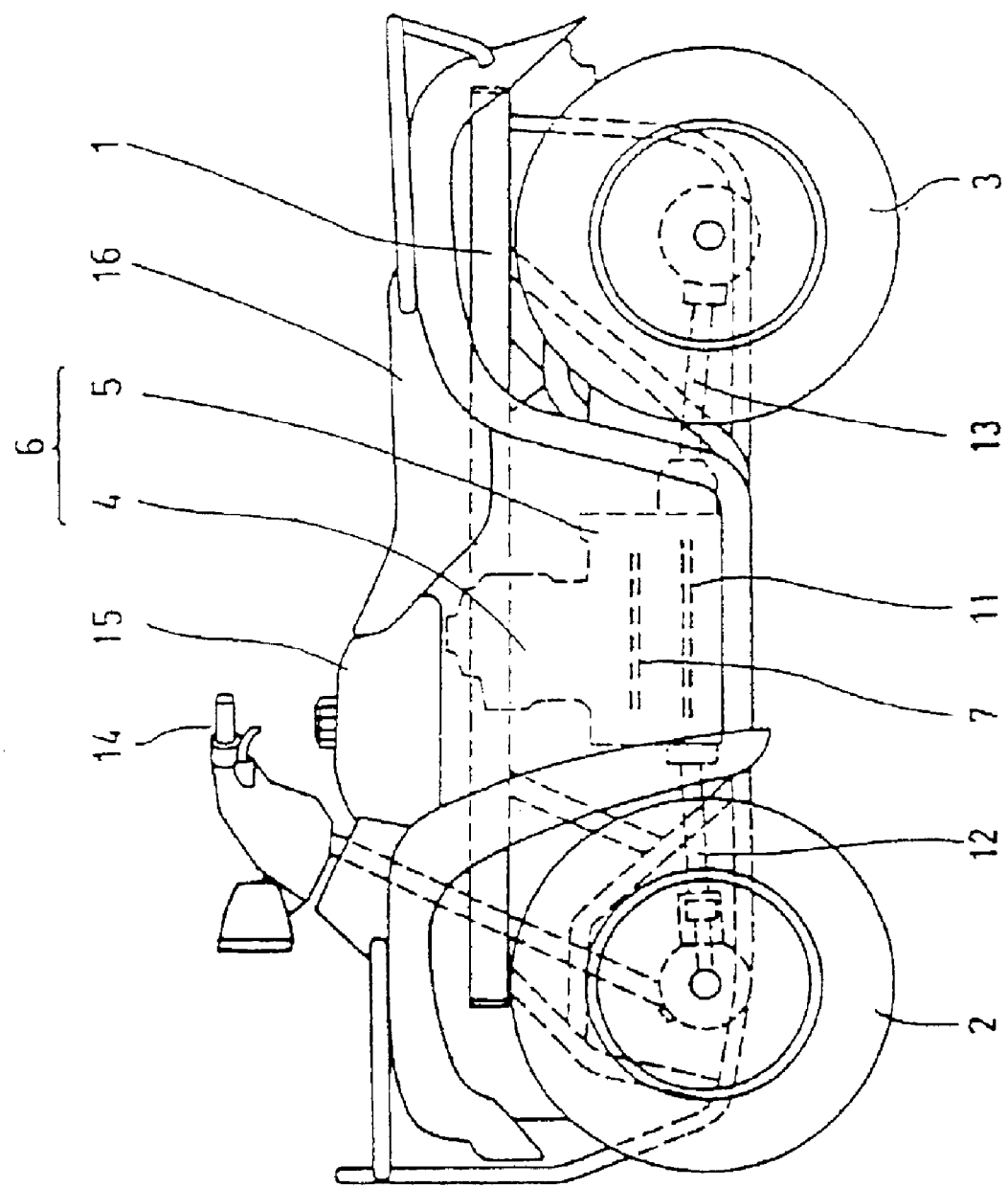
FIG. 1 is a side view of a four-wheel buggy car (saddle ride type vehicle for operating on wasteland) on which an internal combustion engine with a torque converter according to the present invention is mounted.

FIG. 1 is a side view of a four-wheel buggy car (saddle ride type vehicle for operating on wasteland) on which an internal combustion engine with a torque converter according to the present invention is mounted. The buggy car has a structure in which left-right pairs of front wheels 2 and rear wheels 3 are provided, respectively, at front and rear portions of a vehicle body frame 1, and a power unit 6 integrally constituting an internal combustion engine 4 and a transmission 5 is supported on a central portion of the vehicle body frame 1. The power unit 6 is disposed with a crankshaft 7 directed in the front-rear direction of the vehicle body.

The rotation of the crankshaft 7 is transmitted through a main shaft 8, a counter shaft 9, and an intermediate shaft 10 (all shown in FIG. 4) of the transmission to an output shaft 11. These shafts are all parallel to the crankshaft, and are disposed in the front-rear direction of the vehicle body. The front wheels 2 are driven by a front wheel drive shaft 12 connected to the front end of the output shaft 11, while the rear wheels 3 are driven by a rear wheel drive shaft 13 connected to the rear end of the output shaft 11. A steering handle 14, a fuel tank 15, and a saddle type seat 16 are provided, in this order from the front side, at upper portions of the vehicle body.

Figure 2:
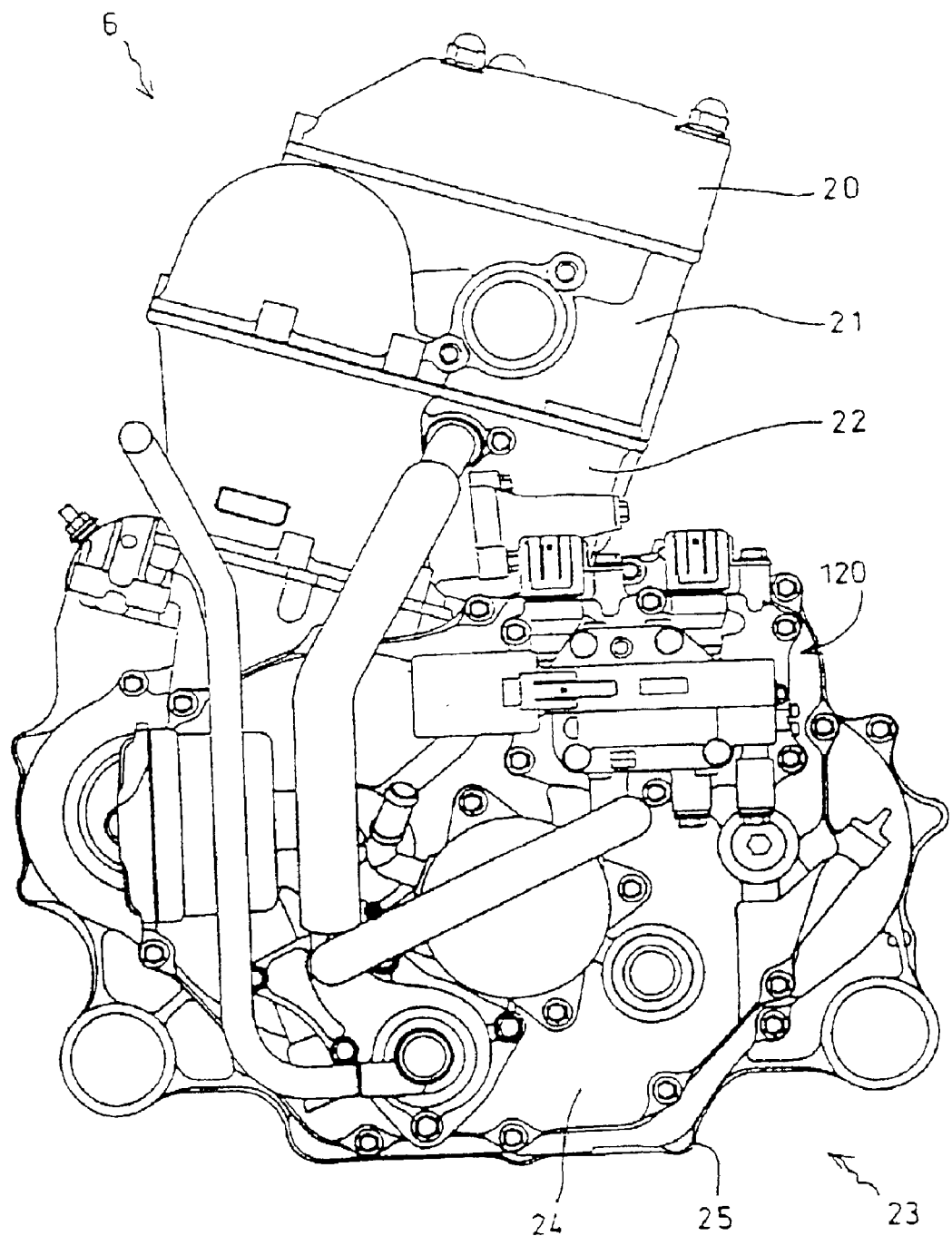
FIG. 2 is a front view of a power unit according to the present invention.

FIG. 2 is a front view of the power unit 6 according to the present invention, in which the front surface of the power unit 6 is viewed from the front side. A main body portion of the power unit 6 is generally composed of four portions, namely, a cylinder head cover 20, a cylinder head 21, a cylinder block 22, and a crankcase 23, in this order from the upper side.

In addition, the crankcase 23 is divided in a plane orthogonal to the crankshaft 7 into four portions, which consist of a front crankcase cover 24, a front crankcase 25, a rear crankcase 26 and a rear crankcase cover 27 (these are partially shown in FIGS. 4 and 5), in this order from the front side. In FIG. 2, the front crankcase cover 24 is seen, and the front crankcase 25 is seen a little in the surroundings thereof. Various equipment and pipings are fitted to a front surface of the front crankcase cover 24.

Figure 3:
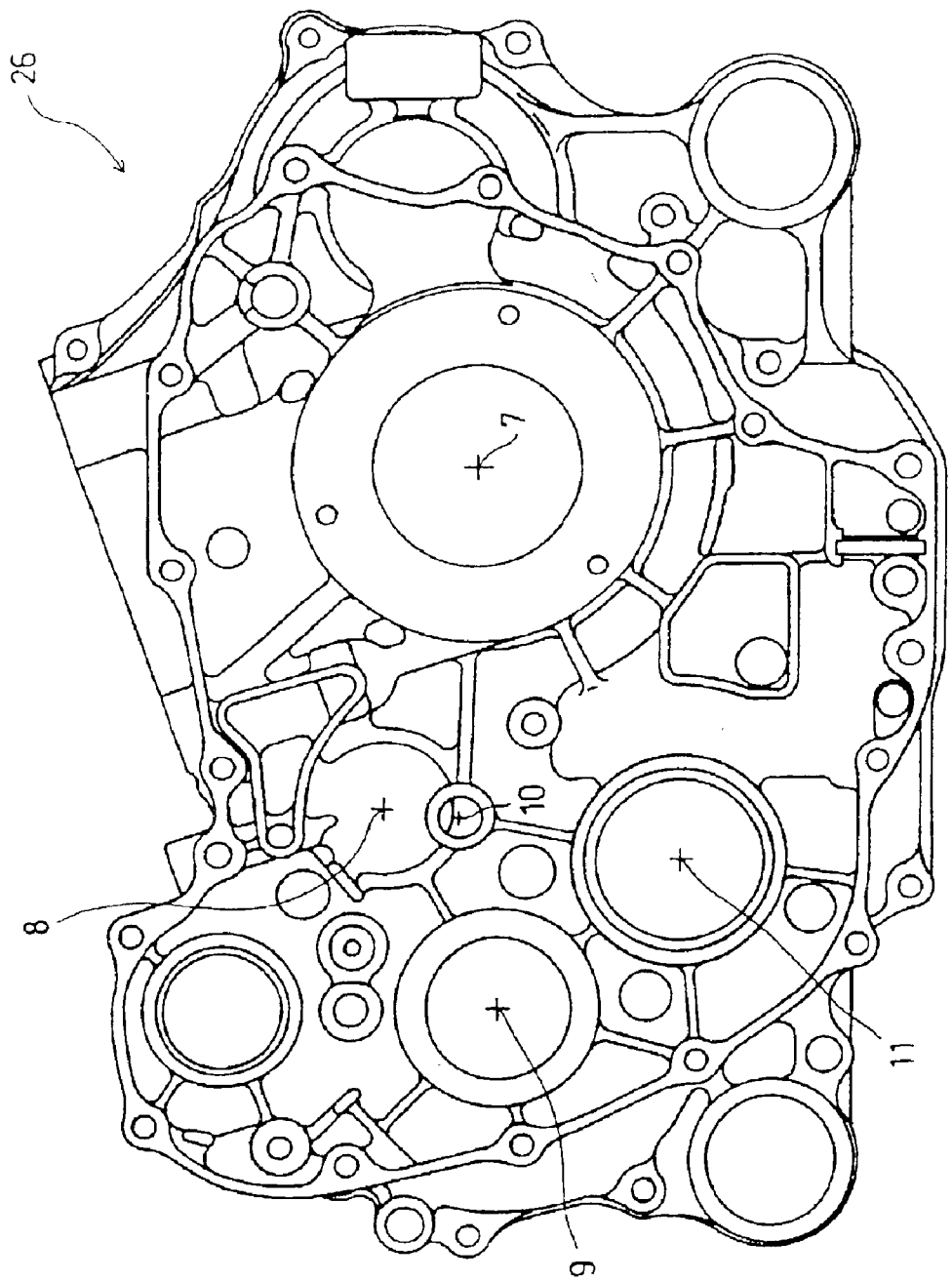
FIG. 3 is a view of a rear crankcase from the rear side.

FIG. 3 is a view of the rear crankcase 26 from the rear side. This figure shows the positions of the crankshaft 7, and the main shaft 8, the counter shaft 9, the intermediate shaft 10 and the output shaft 11 of the transmission.

Figure 4:
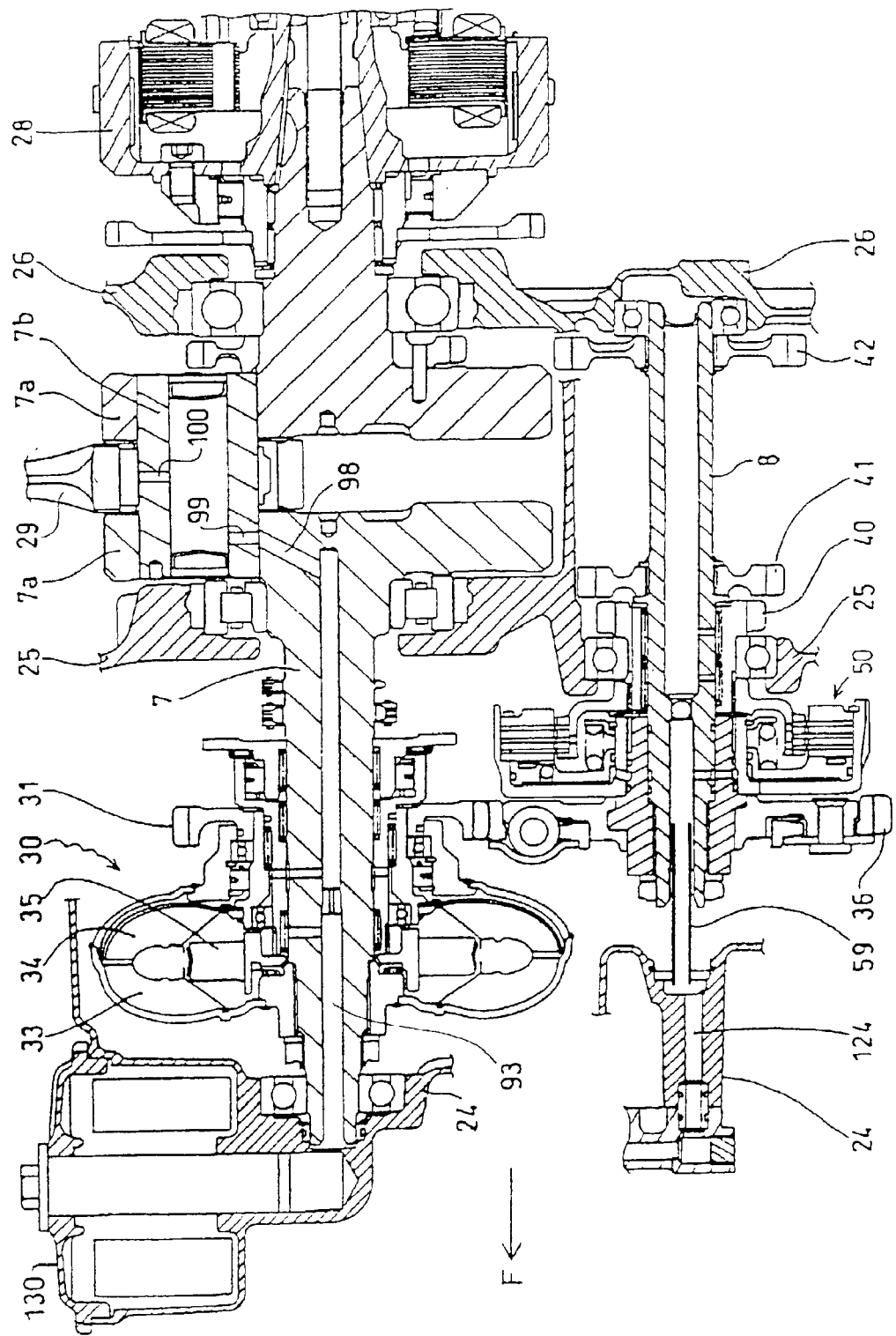
FIG. 4 is a vertical sectional view of the inside of a crankcase, showing the relationship between a crankshaft and a main shaft.
Figure 5:
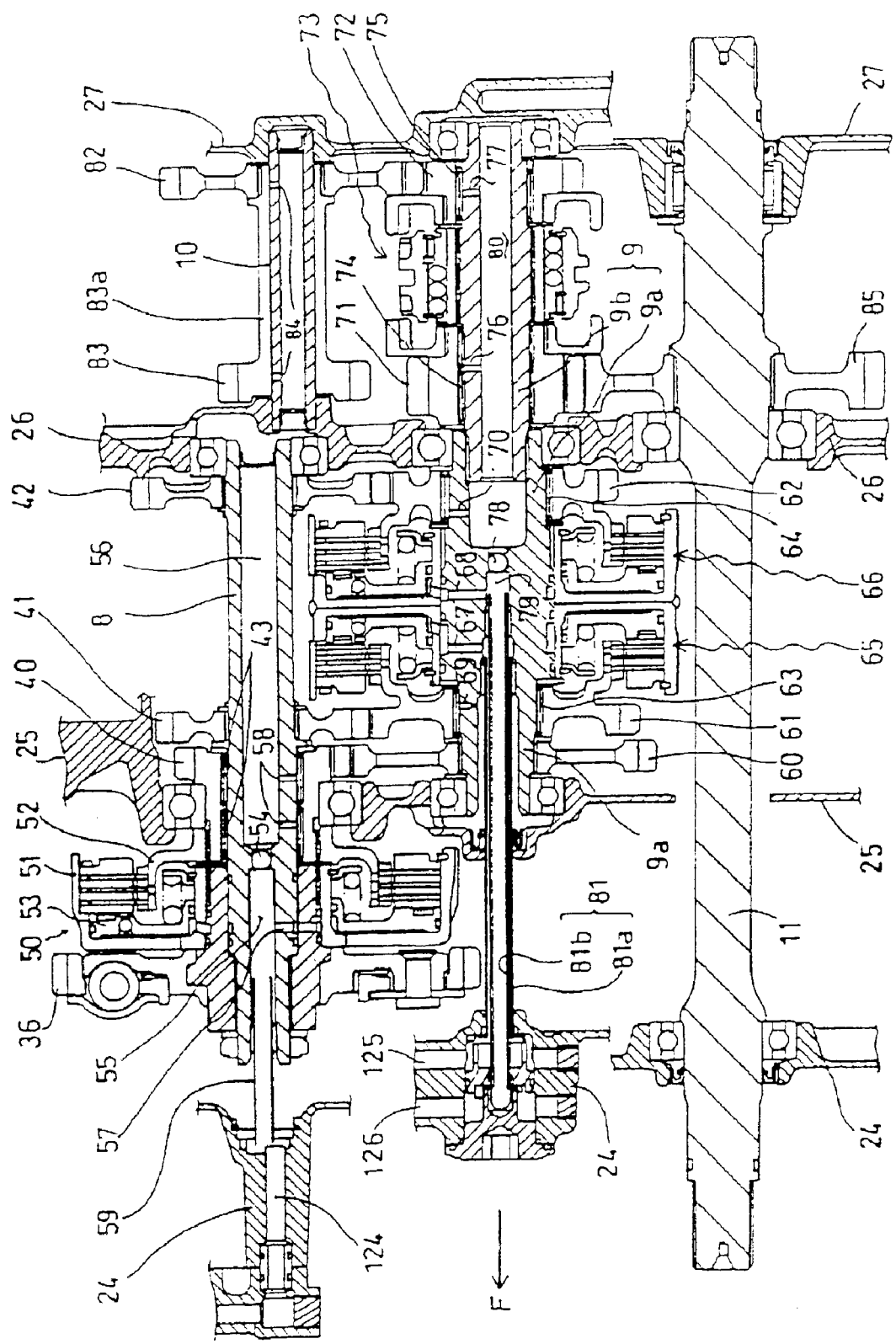
FIG. 5 is a vertical sectional view of the inside of the crankcase, showing the relationship among the main shaft, a counter shaft, an intermediate shaft, and an output shaft.
Figure 6:
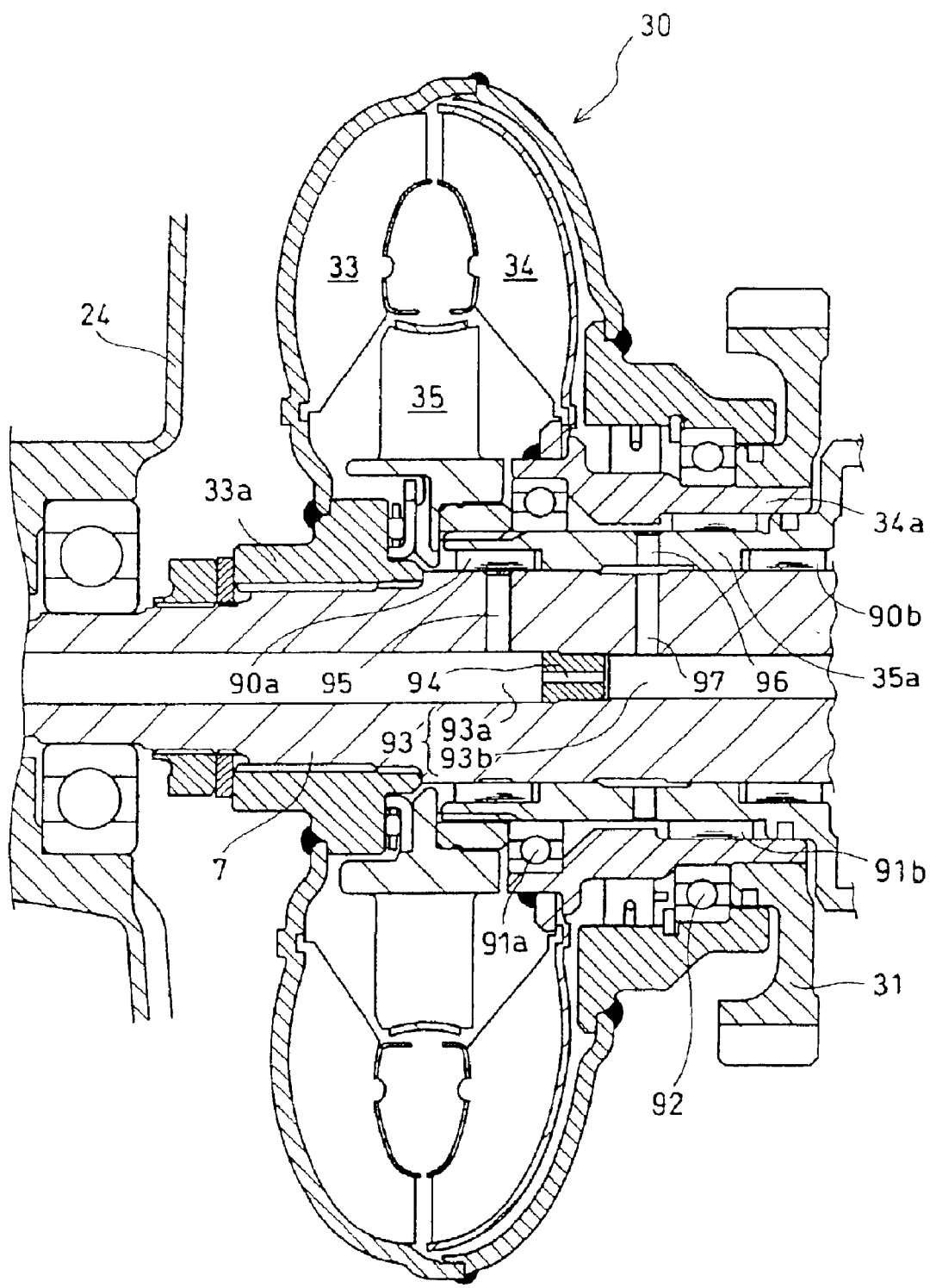
FIG. 6 is an enlarged view of the torque converter in FIG. 4.

FIGS. 4 and 5 are vertical sectional views of the inside of the crankcase passing through main shafts in the crankcase, in which FIG. 4 shows the relationship between the crankshaft 7 and the main shaft 8, and FIG. 5 shows the relationship among the main shaft 8, the counter shaft 9, the intermediate shaft 10, and the output shaft 11. In these figures, arrow F indicates the front or forward direction. FIG. 6 is an enlarged view of the torque converter 30 in FIG. 4.

FIG. 4 shows a power transmission mechanism between the crankshaft 7 and the main shaft 8. The crankshaft 7 is supported on the front and rear crankcases 25 and 26 through bearings. A front extended portion of the crankshaft 7 is supported on the front crankcase cover 24 through a bearing. The crankshaft 7 is divided into front and rear portions, which are connected by a crank pin 7b at a crank web 7a. An AC generator 28 for generating power by rotation of the crankshaft 7 is fitted to the rear end of the crankshaft 7.

In addition, the crankshaft 7 is provided with a torque converter 30. The torque converter 30 includes a pump impeller 33 fixed to the crankshaft 7, a turbine runner 34 opposed to the pump impeller 33 and so disposed as to be rotatable relative to the crankshaft 7 and a stator 35 disposed at an intermediate portion between the pump impeller 33 and the turbine runner 34 so as to be rotatable relative to both the crankshaft 7 and the turbine runner 34. Working oil is made to fill up a closed space formed by the pump impeller 33 and the turbine runner 34. When the pump impeller 33 is rotated by the rotation of the crankshaft 7, the turbine runner 34 is also rotated due to the flow of the working oil.

A primary driving gear 31 is attached to the turbine runner 34. On the other hand, a primary driven gear 36 constantly meshed with the primary driving gear 31 is fixed to a front end portion of the main shaft 8 of the transmission. Therefore, the rotation of the crankshaft 7 is transmitted to the main shaft 8 through the pump impeller 33, the turbine runner 34 and further through primary speed reduction by the primary driving gear 31 and the primary driven gear 36.

FIG. 5 shows a power transmission mechanism among the main shaft 8, the counter shaft 9, the intermediate shaft 10 and the output shaft 11 of the transmission. The main shaft 8 of the transmission is supported on the front and rear crankcases 25 and 26 through bearings. The main shaft 8 is provided with a first gear position driving gear 40, a second gear position driving gear 41 and a third gear position driving gear 42, which differ in the number of teeth according to speed reduction ratios. The second gear position driving gear 41 and the third gear position driving gear 42 are fixed gears, which are fixed on the main shaft 8, while the first gear position driving gear 40 is rotatably supported on the main shaft 8 through a needle bearing 43. In the description below, generally, a gear rotatably supported on a rotary shaft through a needle bearing or the like is called a floating gear.

A first gear position oil hydraulic type multiple disk clutch 50 is intermediately provided between the main shaft 8 and the first gear position driving gear 40. The clutch has a clutch outer 51 fixed to the main shaft 8 and a clutch inner 52 connected to the first gear position driving gear 40. A pressure plate 53 is movable in the axial direction and is fitted to the clutch outer 51. The main shaft 8 is provided with a center hole steppedly varied in inside diameter on the centerline thereof. A steel ball 54 is pressed into a narrowest portion of the center hole to partition the center hole into a front portion center hole 55 and a rear portion center hole 56. The main shaft 8 is provided with a working oil supply hole 57 for communicating the front center hole 55 with the first gear position oil hydraulic type multiple disk clutch 50 and a lubricating oil supply hole 58 for communicating the rear portion center hole 56 with the needle bearing 43.

The working oil for the first gear position oil hydraulic type multiple disk clutch 50 is fed from the side of the front crankcase cover 24 to the front portion center hole 55 through a working oil supply pipe 59, and is supplied to the clutch 50 through the working oil supply hole 57, as shown in FIG. 5. The working oil comes to a position between the clutch outer 51 and the pressure plate 53. With the pressure plate 53 moved by the oil pressure, the clutch is set into a connected condition, whereby the first gear position driving gear 40 is fixed to the main shaft 8 and the rotation of the main shaft 8 is transmitted to the first gear position driving gear 40.

The counter shaft 9 comprises a front portion counter shaft 9a and a rear portion counter shaft 9b, which are integrated with each other to form the counter shaft 9, and the counter shaft 9 is supported on the front crankcase 25, the rear crankcase 26 and the rear crankcase cover 27 through bearings. The front portion counter shaft 9a is provided with a first gear position driven gear 60, a second gear position driven gear 61, and a third gear position driven gear 62, which are constantly meshed, respectively, with the first gear position driving gear 40, the second gear position driving gear 41, and the third gear position driving gear 42 on the main shaft 8.

The first gear position driven gear 60 is a fixed gear fixed to a shaft, while the second gear position driven gear 61 and the third gear position driven gear 62 are floating gears, which are supported rotatably in relation to the counter shaft 9 through needle bearings 63 and 64, respectively. A second gear position oil hydraulic type multiple disk clutch 65 and a third gear position oil hydraulic type multiple disk clutch 66 are intermediately provided between the counter shaft 9 and these floating gears, respectively. In these clutches, a clutch outer is fixed to the counter shaft 9, and a clutch inner is connected to the floating gear. The constitution and actions of these clutches are the same as those of the above-mentioned first gear position oil hydraulic type multiple disk clutch 50. Working oil is supplied through working oil supply holes 67 and 68 formed in the counter shaft, whereby floating of the floating gears is stopped, to enable transmission of power, thereby performing speed reduction at the second gear position or the third gear position. Lubricating oil supply holes 69 and 70 leading to the needle bearings 63 and 64 for bearing the second gear position driven gear 61 and the third gear position driven gear 62 are also formed in the counter shaft 9.

The counter shaft 9 composed of the front portion counter shaft 9a and the rear portion counter shaft 9b integrated with each other is provided with a center hole, which is partitioned into a front portion center hole 79 and a rear portion center hole 80 by a steel ball 78 press fitted in a narrowest portion thereof. The supply of a working oil to the second and third gear position oil hydraulic type multiple disk clutches 65 and 66 is conducted from the side of the front crankcase cover 24 through a double-wall pipe 81. The double-wall pipe 81 consists of an outer pipe 81*a* and an inner pipe 81*b*. The working oil for the second gear position oil hydraulic type multiple disk clutch 65 is supplied through an oil passage between the outer pipe 81*a* and the inner pipe 81*b* and through the working oil supply hole 67. The working oil for the third gear position oil hydraulic type multiple disk clutch 66 is supplied through an oil passage inside the inner pipe 81*b* and the working oil supply hole 68.

The rear portion counter shaft 9*b* is provided with a forward-running driving gear 71 and a backward-running driving gear 72. These are both floating gears, of which the one engaged with a manual dog clutch 73 provided at an intermediate position therebetween is fixed to a shaft, whereby transmission of power is enabled. Lubricating oil supply holes 76 and 77 for supplying a lubricating oil to needle bearings 74 and 75, respectively, bearing the forward-running driving gear 71 and the backward-running driving gear 72 are formed in the rear portion counter shaft 9*b*.

The intermediate shaft 10 is supported on the rear crankcase 26 and the rear crankcase cover 27. A first intermediate gear 82 constantly meshed with the backward-running driving gear 72 and a second intermediate gear 83 connected to the first intermediate gear 82 through a long sleeve portion 83*a* are rotatably held on the intermediate shaft 10.

The output shaft 11 is supported on the front crankcase cover 24, the rear crankcase 26, and the rear crankcase cover 27 through bearings. The output shaft 11 pierces through the front crankcase 25 without making contact with the front crankcase 25. Further, an output shaft driven gear 85, constantly meshed with the forward-running driving gear 71 and the second intermediate gear 83, is fixed onto the output shaft 11. The output shaft driven gear 85 is driven for forward rotation or driven for reverse rotation through the gear with which the dog clutch 73 is engaged, whereby the output shaft 11 is rotated in a direction suitable for forward operation or backward operation of the vehicle. Such a control is made that the reverse-rotation driving is connected only when the counter shaft 9 is rotating at the first gear position.

The pairs of the first gear position driving gear 40 and the first gear position driven gear 60, the second gear position driving gear 41 and the second gear position driven gear 61, and the third gear position driving gear 42 and the third gear position driven gear 62 in the transmission described above are all, respectively, constantly meshed gears, wherein the speed change ratios is effected and determined by which of the oil hydraulic type multiple disk clutches 50, 65, and 66 is set into the connected condition. The control of the oil pressures for this is conducted by a valve body 120 assembled as an integral oil pressure control system by collecting solenoid valves and oil pressure changeover valves, which are fitted to a front surface of the front crankcase cover 24 as shown in FIG. 2. The oil fed from the oil pump (not shown) to the valve body 120 is fed out therefrom as the working oil for the oil hydraulic type multiple disk clutches 50, 65, 66, and as the lubricating oil for each portion of the engine.

Namely, as for the working oil for the first gear position oil hydraulic type multiple disk clutch 50, as shown in FIG. 5, the working oil fed out from the valve body to an inlet 124 for the working oil to be fed towards the first gear position oil hydraulic type multiple disk clutch 50 is fed into the front portion center hole 55 of the main shaft 8 through a working oil supply pipe 59 provided bridgingly from the rear surface of the crankcase cover 24 to the front portion center hole 55, and is supplied to the first gear position oil hydraulic type multiple disk clutch 50 through a working oil supply hole 57.

Similarly, the working oil fed out from the valve body 120 to an inlet 125 for the working oil to be fed towards the second gear position oil hydraulic type multiple disk clutch 65 or to an inlet 126 for the working oil to be fed towards the third gear position oil hydraulic type multiple disk clutch 66 is fed into the center portion center hole 79 of the counter shaft 9 through either of inner and outer passages of a working oil supply double-wall pipe 81 provided bridgingly to the front portion center hole 79, and is supplied to the second gear position oil hydraulic type multiple disk clutch 65 or the third gear position oil hydraulic type multiple disk clutch 66.

Next, the torque converter 30 will be described in detail referring to FIG. 6. In FIG. 6, a boss portion 33*a* of the pump impeller 33 is attached to the crankshaft 7. In addition, a boss portion 35*a* of the stator 35 is rotatably supported on the crankshaft 7 through needle bearings 90*a* and 90*b*. Further, a boss portion 34*a* of the turbine runner 34 is rotatably supported on the boss portion 35*a* through a ball bearing 91*a* and a needle bearing 91*b*. The above-mentioned primary driving gear 31 is attached to the boss portion 34*a*. A ball bearing 92 is disposed between the boss portion 34*a* and the pump impeller 33.

A center hole 93 is bored in the crankshaft 7 along the axis, and a front end portion thereof is in communication with an outlet of an oil filter 130 provided with a relief valve (FIG. 4). The center hole 93 is partitioned by an orifice 94 into a front portion center hole 93*a* and a rear portion center hole 93*b*.

The crankshaft 7 is provided with a working oil supply hole 95 for providing communication of the needle bearing 90*a* with the front portion center hole 93*a*. In addition, the boss portion 35*a* of the stator 35 and the crankshaft 7 are provided, respectively, with working oil discharge holes 96 and 97 for providing communication of a portion between the ball bearing 91*a* and the needle bearing 91*b* with the rear portion center hole 93*b*. As shown in FIG. 4, oil passages 98, 99, and 100 for supplying the lubricating oil to the crank pin 7*b* and the connecting rod 29 are provided at the rear end of the center hole 93.

The oil deprived of foreign matter by an oil filter 130 is introduced into the front portion center hole 93*a* through the front end of the crankshaft 7. Most of the oil is fed through a working oil supply hole 95 and the needle bearing 91*a*, passed through a portion between the boss portion 33*a* and the boss portion 35*a*, and is supplied into the pump impeller 33 as working oil. When the pump impeller 33 is rotated by the rotation of the crankshaft 7, the turbine runner 34 is also rotated, and the rotation is transmitted to the main shaft 8 through the primary driving gear 31 and the primary driven gear 36 as described above. The working oil having rotated the turbine runner 34 and having been lowered in pressure is discharged through the ball bearing 91*a* and working oil discharge holes 96 and 97 into the rear portion center hole 93*b*.

A portion of the oil introduced into the front portion center hole 93*a* through the front end of the crankshaft 7 flows through the orifice 94 into the rear portion center hole 93*b*, where it mixes with the working oil discharged from the torque converter 30 through the working oil discharge holes 96 and 97. Then, the portion of the oil flows from the rear end of the center hole 93 through the oil passages 98, 99, 100, and the like, to be supplied to the crank pin 7b, the connecting rod 29, and the like as a lubricating oil.

When left to stand for a long time, about one half of the oil inside the torque converter 30 drains through gaps between the bearing portions. In such a situation, immediately after starting, a period of time is required for the torque converter to be filled with oil. In addition, immediately after starting at an extremely low temperature, the viscosity of the oil inside the torque converter 30 is high, so that a longer time is required for the oil to pass through the torque converter 30. Therefore, if the oil supplied to the connecting rod 29 and the like is all passed through the torque converter 30, lubrication of the connecting rod 29 and the like is retarded. In the present embodiment, the orifice 94 bypasses the torque converter 30 so as to connect the front portion center hole 93a to the rear portion center hole 93b along the axis of the crankshaft 7, so that the timing of the start of lubrication of the connecting rod 29 and the like is not retarded even at an extremely low temperature.

Besides, by appropriate selection of the hole diameter of the orifice 94, an extreme rise in oil pressure inside the front portion center hole 93a is mitigated, and distribution of oil pressure to the torque converter 30 and the orifice 94 can be made to be appropriate. Since the passage (the front portion center hole 93a and the like) for supplying the working oil to the torque converter 30 is used also as the passage for supplying the lubricating oil to the crankshaft 7, the connecting rod 29, and the like, boring of oil holes is easy.

In the present embodiment, in addition, the pump impeller 33 of the torque converter 30 is attached to the crankshaft 7, so that the torque converter 30 is constantly rotated by the crankshaft 7, whereby speed change shock in the transmission is alleviated, and acceleration and deceleration are performed smoothly. Besides, since the clutch for interrupting the engine output is provided on the side of the transmission, the crankshaft 7 is not long, and mountability onto the vehicle is enhanced.

Further, in the present embodiment, the torque converter 30 is provided at the crankshaft 7, which has a high revolution number, so that the torque converter 30 can be made to be small in size and weight. In addition, in the present embodiment, the oil hydraulic type multiple disk clutches 50, 65, and 66 are disposed dispersedly on the main shaft 8 and the counter shaft 9, so that the high-pressure oil passage is simple in structure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An internal combustion engine with a torque converter includes a crankshaft of said engine and an input shaft of a multi-stage transmission being connected to each other through the torque converter comprising:
   a pump impeller of said torque converter connected to a side of said engine; and
   a turbine runner of said torque converter connected to a side of said multi-stage transmission;
   a stator of the said torque converter;
   a ball bearing for rotatably mounting a boss portion of said turbine runner to a boss portion of said stator, the ball bearing being disposed in oil passage for supplying working oil from said torque converter to a center hole provided in the crankshaft,
   wherein said pump impeller is fixed to said crankshaft and a clutch for connection and disconnection of an output of said engine is provided on the side of said multi-stage transmission.

2. The internal combustion engine with torque converter according to claim 1, wherein the working oil is supplied to said pump impeller through the center hole of said crankshaft and through said bearing for supporting a said boss portion of said stator of said torque converter.

3. The internal combustion engine with torque converter according to claim 2, and further including at least one working oil discharge opening for returning the working oil supplied to said pump impeller to said center hole downstream from an orifice.

4. The internal combustion engine with torque converter according to claim 3, wherein the at least one working oil discharge opening is disposed between the ball bearing and a needle bearing.

5. The internal combustion engine with torque converter according to claim 1, wherein said center hole is partitioned by an orifice inserted in said center hole.

6. The internal combustion engine with torque converter according to claim 5, and further including a primary drive gear secured to said boss portion for said turbine runner for selectively supplying rotation thereto.

7. The internal combustion engine with torque converter according to claim 6, wherein said clutch selectively connects said primary drive gear to a main shaft of the multi-stage transmission.

8. A torque converter for use with an internal combustion engine having a crankshaft and an input shaft of a multi-stage transmission being connected to each other through the torque converter comprising:
   a pump impeller of said torque converter operatively connected to one side of said engine, said pump impeller adapted to be fixed to a crankshaft;
   a turbine runner operatively connected to a side of a multi-stage transmission;
   a stator of the said torque converter;
   a ball bearing for rotatably mounting a boss portion of said turbine runner to a boss portion of said stator, the ball bearing being disposed in oil passage for supplying working oil from said torque converter to a center hole provided in the crankshaft; and
   a clutch for connection and disconnection of an output of said engine, said clutch being provided on the side of the multi-stage transmission.

9. The torque converter according to claim 8, wherein the working oil is supplied to said pump impeller through said center hole of the crankshaft and through said bearing for supporting said boss portion of said stator of said torque converter.

10. The torque converter according to claim 9, and further including at least one working oil discharge opening for returning the working oil supplied to said pump impeller to said center hole downstream from said orifice.

11. The torque converter according to claim 10, wherein the at least one working oil discharge opening is disposed between the ball bearing and a needle bearing.

12. The torque converter according to claim 8, wherein said center hole is partitioned by an orifice inserted in said center hole.

13. The torque converter according to claim 12, and further including a primary drive gear secured to said boss portion for said turbine runner for selectively supplying rotation thereto.

14. The torque converter according to claim 13, wherein said clutch selectively connects said primary drive gear to a main shaft of the multi-stage transmission.

15. The internal combustion engine with torque converter according to claim 1, and further including a supply opening upstream of an orifice for supplying the working oil from said crankshaft to said pump impeller.

16. The torque converter according to claim 8, and further including a supply opening upstream of an orifice for supplying the working oil from said crankshaft to said pump impeller.

* * * * *